(12) United States Patent
Nicholson

(10) Patent No.: US 12,705,666 B2
(45) Date of Patent: Aug. 11, 2026

(54) LANGUAGE AGNOSTIC ARCHITECTURE FOR A SEARCH ENGINE

(71) Applicant: Shutterstock, Inc., New York, NY (US)

(72) Inventor: Patrick Nicholson, Dublin (IE)

(73) Assignee: Shutterstock, Inc., New York, NY (US)

( * ) Notice: Subject to any disclaimer, the term of this patent is extended or adjusted under 35 U.S.C. 154(b) by 489 days.

(21) Appl. No.: 18/157,697

(22) Filed: Jan. 20, 2023

(65) Prior Publication Data

US 2024/0095812 A1 Mar. 21, 2024

Related U.S. Application Data

(60) Provisional application No. 63/407,493, filed on Sep. 16, 2022.

(51) Int. Cl.
*G06Q 30/0601* (2023.01)
*G06F 16/901* (2019.01)
(Continued)

(52) U.S. Cl.
CPC ..... *G06Q 30/0641* (2013.01); *G06F 16/9027* (2019.01); *G06F 16/953* (2019.01); *G06N 5/02* (2013.01)

(58) Field of Classification Search
CPC ............ G06Q 30/0641; G06F 16/9027; G06F 16/953; G06F 16/9024; G06N 5/02
See application file for complete search history.

(56) References Cited

U.S. PATENT DOCUMENTS 6,006,221 A * 12/1999 Liddy ..................... G06F 16/93 707/999.005
8,255,786 B1 * 8/2012 Gattani ................. G06F 16/955 715/208
(Continued)

FOREIGN PATENT DOCUMENTS

WO 2022/031293 A1 2/2022

OTHER PUBLICATIONS

"The Use of Ontology in Retrieval: A Study on Textual, Multilingual, and Multimedia Retrieval" Muhammad Nabeel Asim et all (Year: 2019).*
(Continued)

*Primary Examiner* — Victoria E. Frunzi
(74) *Attorney, Agent, or Firm* — McDermott Will & Schulte LLP

(57) ABSTRACT

A data structure to facilitate language agnostic searches in an online marketplace is provided. The data structure includes multiple nodes, each node having one or more labels associated to a network resource; and multiple links joining a parent node to a child node. A first label is associated with one or more words in a first language, the link indicates a navigation route for a search engine to move from the parent node to the child node in search of a pre-selected media file, and a label in a parent node is associated with an unambiguous concept in a knowledge base, the network resource includes one or more media files associated with a license weight, and the license weight for the parent node is higher than the license weight for the child node.

9 Claims, 10 Drawing Sheets

(51) Int. Cl.

| | |
|---|---|
| ***G06F 16/953*** | (2019.01) |
| ***G06N 5/02*** | (2023.01) |

(56) References Cited

U.S. PATENT DOCUMENTS

| | | | | |
|---|---|---|---|---|
| 11,409,790 | B2 | 8/2022 | Roy et al. | |
| 2008/0091408 | A1* | 4/2008 | Roulland | G06F 40/211 707/E17.074 |
| 2016/0239182 | A1* | 8/2016 | Eronen | G06F 3/017 |
| 2016/0366483 | A1* | 12/2016 | Joyce | G06F 16/7867 |
| 2025/0078101 | A1* | 3/2025 | Tenneti | G06Q 30/0625 |

OTHER PUBLICATIONS

Ferragina, P., et al., Fast and Accurate Annotation of Short Texts with Wikipedia Pages, IEEE Software, 29(1): pp. 70-75 (2012).

Vedula, N., et al., Enriching Taxonomies with Functional Domain Knowledge, Ann Arbor, Mi (US) Sigir 2018: Jul. 8-12, 2018; pp. 745-754.

US/ISA—International Search Report and Written Opinion Report for related International Application No. PCT/US2023/032787 mailed Nov. 28, 2023, 15 pgs.

* cited by examiner 318
334
320
352
342
316
332
314
312
300
301
302

FIG. 3

LANGUAGE AGNOSTIC ARCHITECTURE FOR A SEARCH ENGINE

CROSS-REFERENCE TO RELATED APPLICATIONS

The present disclosure is related and claims priority under 35 U.S.C. § 119(e) to U.S. Prov. Appln. No. 63/407,493, entitled LANGUAGE AGNOSTIC SYSTEM FOR SEARCH ENGINE OPTIMIZATION, to Patrick NICHOLSON, filed on Sep. 16, 2022, the contents of which are hereinafter incorporated by reference in their entirety, for all purposes.

BACKGROUND

Field

The present disclosure generally relates to search engine architectures for online digital marketplaces. More specifically, the present disclosure relates to language agnostic architectures that can be implemented globally to reach a broader user base.

Description of the Related Art

Search engines in online digital networks are heavily dependent on language. The producers of media content typically upload their content in a given language, and the consumers of such content typically search for it in a different language. While many applications and systems may be used for language translation purposes at any level within typical search engine architectures, the buildup of the architecture itself remains biased toward a specific language (typically, English). This hinders the effectiveness of the engine when different languages are involved, and requires network developers to spend much time and resources to adjust the architecture to a specific market every time a new language needs to be covered.

SUMMARY

In one embodiment, a data structure includes multiple nodes, each node having one or more labels associated to a network resource, and multiple links joining a parent node to a child node. In the data structure, a first label is associated with one or more words in a first language, the link indicates a navigation route for a search engine to move from the parent node to the child node in search of a pre-selected media file, and a label in a parent node is associated with an unambiguous concept in a knowledge base, the network resource includes one or more media files associated with a license weight, and the license weight for the parent node is higher than the license weight for the child node.

In a second embodiment, a computer-implemented method includes receiving, in an online marketplace, from a client device used by a media producer, a media file, wherein the online marketplace stores multiple media files, receiving, from the media producer, a metadata associated with the media file, the metadata including a textual description of a media file content, associating a one or more words in the textual description of the media file content with an unambiguous concept according to a knowledge database, wherein the knowledge database is a multilingual resource, and storing, in a database, a map linking the media file with the unambiguous concept.

In a third embodiment, a computer-implemented method includes identifying, in an online marketplace, a top search query for an unambiguous concept, the top search query including multiple links, each link associating one of multiple labels with a media file, wherein the labels are written in a first language, ranking the labels resulting from the multiple links by a licensing weight of the media file associated with each label, and forming a first map linking the labels hierarchically according to the ranking.

In yet other embodiments, a system includes a first means to store instructions and a second means to execute the instructions to perform a method. The method includes receiving, in an online marketplace, from a client device used by a media producer, a media file, wherein the online marketplace stores multiple media files, receiving, from the media producer, a metadata associated with the media file, the metadata including a textual description of a media file content, associating a one or more words in the textual description of the media file content with an unambiguous concept according to a knowledge database, wherein the knowledge database is a multilingual resource, and storing, in a database, a map linking the media file with the unambiguous concept.

It is understood that other configurations of the subject technology will become readily apparent to those skilled in the art from the following detailed description.

BRIEF DESCRIPTION OF THE DRAWINGS

FIG. 3 is a block diagram illustrating systems and steps to implement a language-agnostic search engine in an online marketplace, according to some embodiments.

In the figures, elements and steps denoted by the same or similar reference numerals are associated with the same or similar elements and steps, unless indicated otherwise.

DETAILED DESCRIPTION

Figure 1:
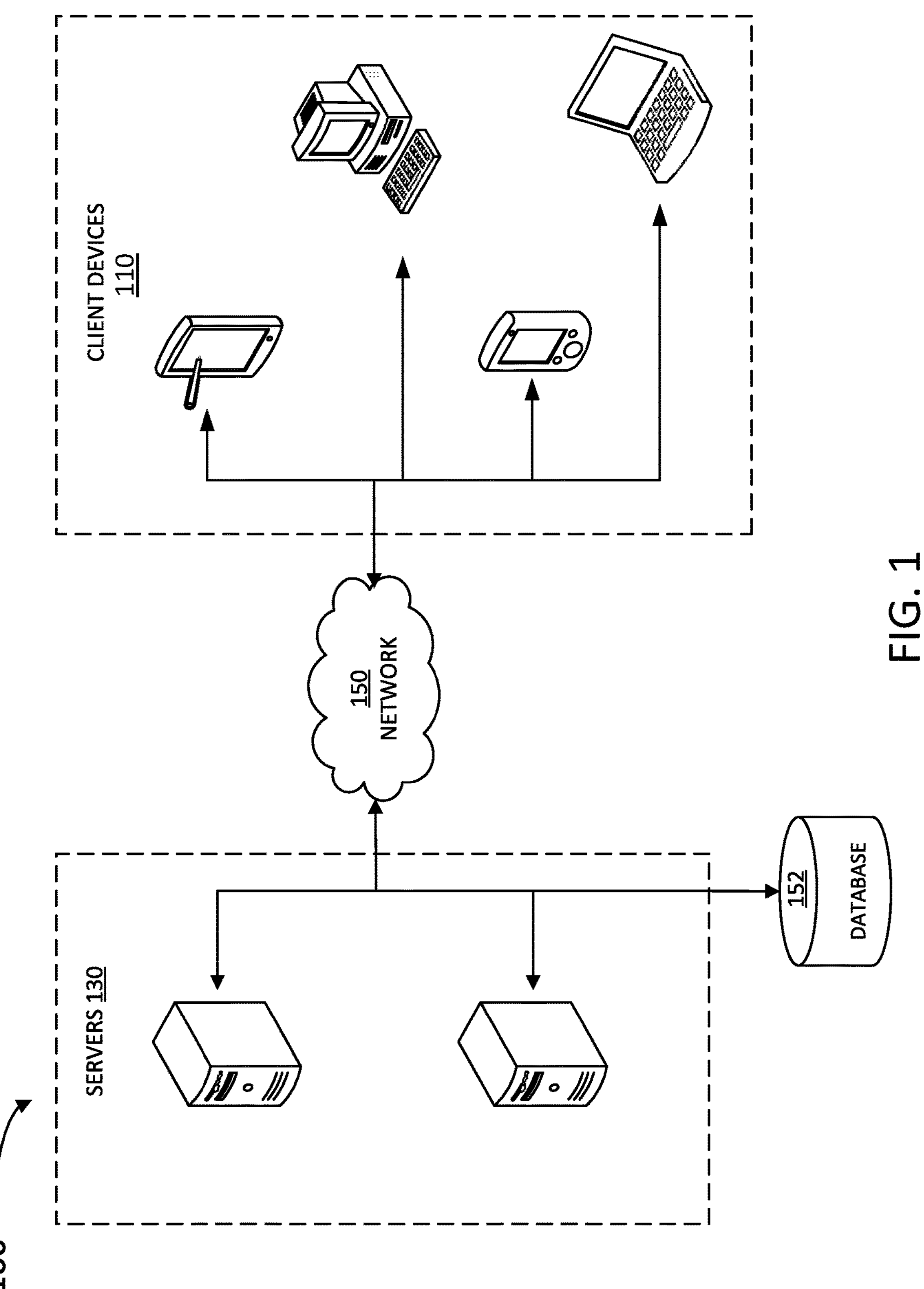
FIG. 1 illustrates an example architecture in a language-agnostic search engine for an online marketplace, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, and the like). A content item can be a single picture, a single video file, an audio file, or any combination of the above. The term "image identifier" as used herein may refer to a form of metadata such as a tag and a label, or a search query associated with an image for identifying the image.

The present disclosure relates to a system for building multilingual sitemaps and category structures for an online digital marketplace. An online digital marketplace as disclosed herein includes a searchable store of digital assets, or media files such as images, videos, and audio files. Database structure for the storage of media files is critical for an efficient and effective search engine. Multilingual sitemaps and category structures are important for search engine optimization, and often require large amounts of manual effort to develop and roll out. Embodiments disclosed herein include data structures that allow the creation and maintenance of such sitemaps in a fully automated way. These data structures are simple and cost-effective to handle and increase the effectiveness of a search engine in the online digital marketplace. This puts the online digital marketplace in a privileged position for search rankings across network services.

Embodiments as disclosed herein include ranking tools configured to match the relevance of a given media file in the online marketplace, given a search phrase queried by the users. Regardless of the search engine used, it is desirable that the web crawler finds resources within the disclosed online marketplace for selecting highly ranked results. Accordingly, sitemaps in an online marketplace as disclosed herein include hyperlinks that allow a web crawler to navigate efficiently and arrive quickly to nodes including relevant resources. Some embodiments include multilingual sitemaps that broaden the scope of a search and at the same time provide optimized results regardless of the initial language used for a search query. Methods as disclosed herein include strategies to build multi-lingual sitemaps automatically, without the need for direct translation of webpages containing hundreds of phrases/hyperlinks into each of multiple languages.

Traditional strategies for creating or updating a multilingual sitemap are expensive and time consuming. This imposes severe limitations for an online digital marketplace to keep updated in multiple desirable languages. Embodiments as disclosed herein include category structures that are assigned to media files by asset producers when they are uploaded to the online marketplace. Additionally, some embodiments include categories that are automatically inferred/assigned based on metadata provided by the asset producers. These category structures boost the effectiveness of search engines crawling the online marketplace to find desired resources (e.g., including a text path to show the user "where they are" on the site) to be rendered on both search result pages and digital asset pages.

Traditionally, maintaining category structures in multiple languages is difficult and costly. As user behavior evolves and new assets are uploaded, old category structures become obsolete and need to be updated to reflect relevant aspects of the online marketplace for a given search. Attempting to do this manually in a multilingual ecosystem is virtually impossible.

Embodiments disclosed herein provide multilingual sitemaps and multilingual category structures that minimize the amount of manual translation needed by leveraging crowdsourced multilingual taxonomies. This avoids the large cost and time involved in manual translation each time a category structure is modified in a given language. Additionally, automated data structure updates may run at a much higher frequency than manual process. Accordingly, the sitemaps may be updated in a matter of hours as opposed to a matter of weeks for a manual translation. This allows embodiments as disclosed herein to create sitemaps and category structures that better reflect the current user behavior in the online marketplace.

Example System Architecture

FIG. 1 illustrates an example architecture 100 in a language-agnostic search engine for an online marketplace, according to some embodiments. Architecture 100 includes servers 130 communicatively coupled with client devices 110 over a network 150. One of the many servers 130 is configured to host a memory including instructions which, when executed by a processor, cause the server 130 to perform at least some of the steps in methods as disclosed herein. In some embodiments, the processor is configured to operate a search application in one of client devices 110. The search application may look for media files such as image files, video files, or audio files in a database 152 handled by a marketplace engine in one of servers 130. The user of client devices 110 may include a graphic designer or a document producer (e.g., a photographer, a videographer, an advertiser, and the like) downloading and/or uploading media files to the online marketplace. Accordingly, the server memory may include a marketplace engine and a search engine, configured to generate, maintain, and manage a data structure that supports multilanguage searches. For purposes of load balancing, multiple servers 130 can host memories including instructions to one or more processors, and multiple servers 130 can host a history log and the second image database. Accordingly, client devices 110 may communicate with each other via network 150 and through access to server 130 and resources located therein.

Servers 130 may include any device having an appropriate processor, memory, and communications capability for hosting the marketplace and search engines including multiple tools associated therewith. The marketplace and search engines may be accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the marketplace engine on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
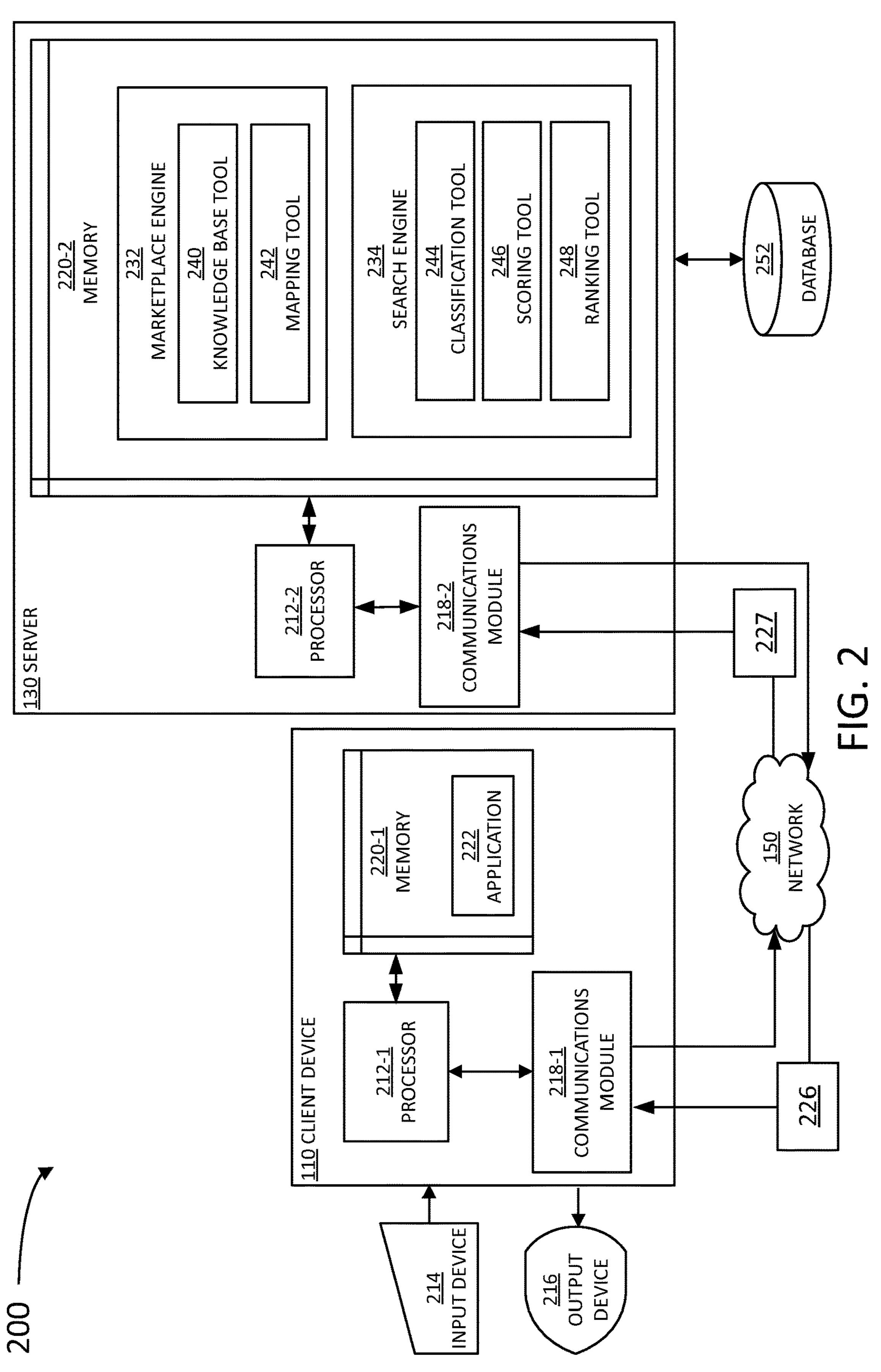
FIG. 2 is a block diagram illustrating an example server and client from the architecture of FIG. 1, according to some embodiments.

FIG. 2 is a block diagram 200 illustrating an example server 130 and client device 110 from the architecture of FIG. 1 and a database 252, according to certain aspects of the disclosure. Client device 110, server 130 and database 252 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards. A user may interact with client device 110 via an input device 214 and an output device 216. Input device 214 may include a mouse, a keyboard, a pointer, a touchscreen, a microphone, and the like. Output device 216 may be a screen display, a touchscreen, a speaker, and the like. Client device 110 may include a memory 220-1 and a processor 212-1. Memory 220-1 may include an application 222, configured to run in client device 110. Application 222 may be downloaded by the user from server 130, and may be hosted by server 130. Application 222 may include a graphic design application hosted by server 130 from which a user downloads or uploads images and other media files from and to any one of servers 130. Moreover, the user may access engines and tools in server 130, as described below. In some embodiments, the user may be a document producer and may upload a media file in a dataset 227 to marketplace engine 232. Similarly, server 130 may provide a media file in a dataset 226 to client device 110 as a result of a licensing or purchasing transaction. In some embodiments, dataset 226 may include a ranked list of search results in response to a search query received from the user (which search query may be included in dataset 227).

Server 130 includes a memory 220-2, a processor 212-2, and communications module 218-2. Hereinafter, processors 212-1 and 212-2, and memories 220-1 and 220-2 will be collectively referred to, respectively, as "processors 212" and "memories 220." Processors 212 are configured to execute instructions stored in memories 220. In some embodiments, memory 220-2 includes a marketplace engine 232 and a search engine 234. Marketplace engine 232 and search engine 234 may share or provide features and resources to application 222, including multiple tools associated with navigating through an online marketplace and searching for media files therein. The user may access marketplace engine 232 and search engine 234 through application 222 or a web browser installed in a memory 220-1 of client device 110. Accordingly, application 222 may be installed by server 130 and perform scripts and other routines provided by server 130 through any one of multiple tools. Execution of application 222 may be controlled by processor 212-1. Marketplace engine 232 may include a knowledge base tool 240 and a mapping tool 242. And search engine 234 may include a classification tool 244, a scoring tool 246, and a ranking tool 248.

Knowledge base tool 240 includes a listing of multiple labels, expressions, phrases, and keywords indicative of concepts arranged in category levels and hierarchies. In some embodiments, the labels, expressions, phrases, and keywords may be provided in one or more languages, and may be arranged in a multilingual sitemap including nodes and edges linking pairs of nodes, wherein the nodes are labeled according to the expressions, phrases, and keywords in the knowledge base. The nodes may be associated to network addresses for one or more media files, assets, and resources that online marketplace engine 232 makes available to users. Knowledge base tool 240 may also have access to a multilingual categorization, wherein the multilingual sitemap is arranged in hierarchies having parent nodes linked to child nodes. The hierarchy indicates a direction of a search flow in search engine 234. In some embodiments, knowledge base tool 240 may include data provided via crowdsourcing, wherein any member of the public may edit the knowledge base by adding annotations, translations, updates, and corrections thereof.

Mapping tool 242 generates, maintains, and updates the multilingual sitemaps and the multilingual categorization for knowledge base tool 240 based on user interactions with search results provided by search engine 234, and also based on information uploaded by document producers onto marketplace engine 232, including their own annotations.

Classification tool 244 arranges the multiple media files and resources in marketplace engine 232 in a multidimensional space wherein a distance between media files and unambiguous concepts may be defined, associating scoring values to the media files provided by scoring tool 246 and ranked by ranking tool 248 provided by search engine 234.

Figure 3:
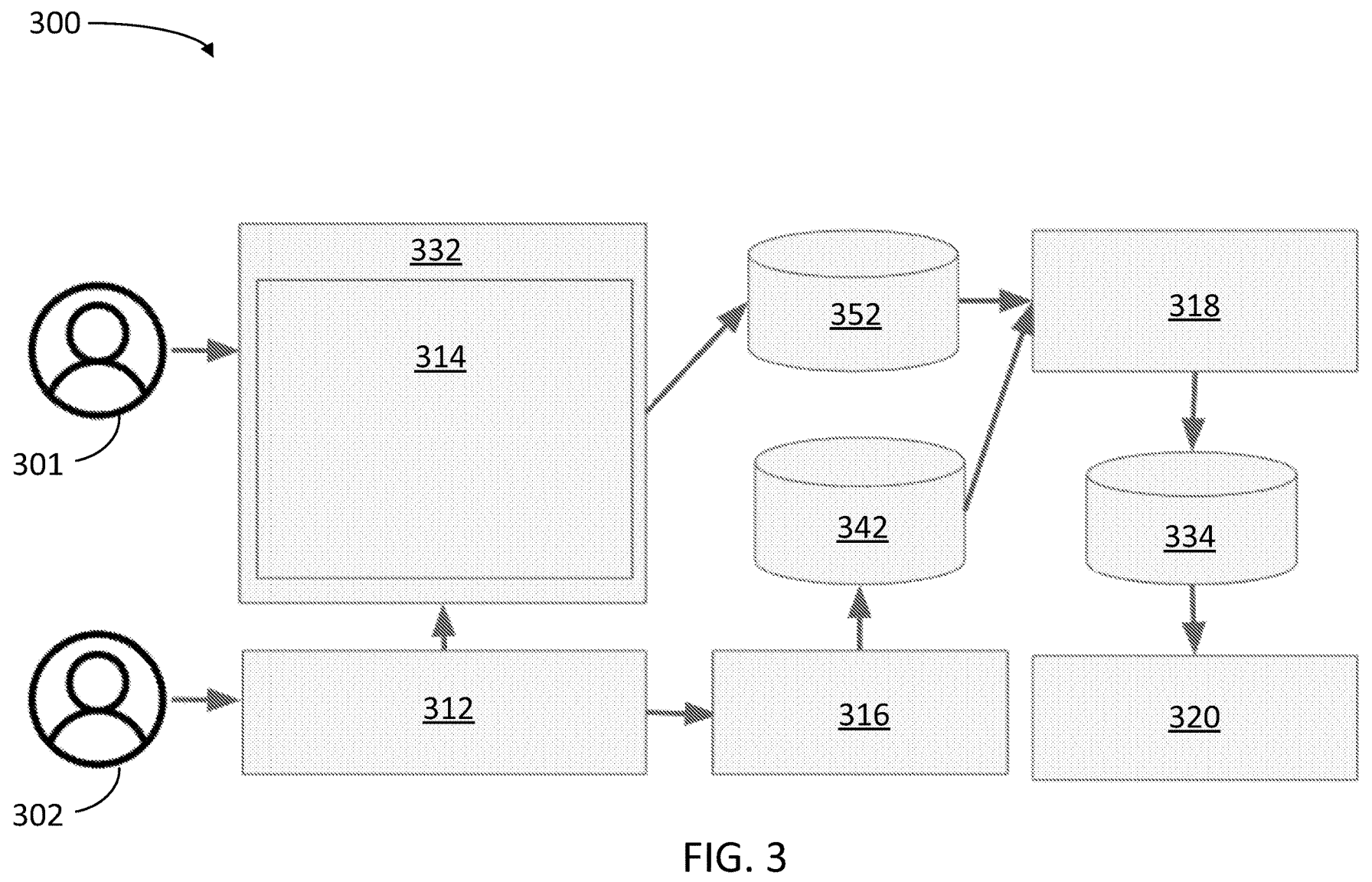

FIG. 3 is a block diagram 300 illustrating systems and steps to implement a language-agnostic search engine 334 in a marketplace engine 332, according to some embodiments. Diagram 300 illustrates how data flows in marketplace engine 332. In step 312, an asset producer 302 or contributor, produces digital assets which can be uploaded to the online marketplace engine 334. Asset producer 302 may include photographers/videographers who upload their photos/videos along with description metadata in step 312. The description metadata typically includes a short free text description of the photo/video content, as well as a set of selected keywords. The metadata allows the asset to be surfaced during a subsequent search, in step 314, by an asset consumer 301. Step 316 includes linking the uploaded asset metadata to unambiguous concepts. In some embodiments, step 316 may be performed by ML and AI algorithms in a knowledge base, as disclosed herein (cf. knowledge base tool 240). A typical and specific method of associating general text with unambiguous concepts is known as Wikification, which links short phrases in a text to Wikipedia or Wikidata concepts, which are understood to be unambiguous. For illustrative purposes, a Wikification example is used, but the same technique can be applied to arbitrary knowledge bases. For example, when the asset has an internal ID: "12345" and the free text description "two dogs with hats," step 316 produces the network nodes associated with hyperlink addresses: "https://www.wikidata.org/wiki/Q144" (dog) and "https://www.wikidata.org/wiki/Q80151" (hat). Step 316 also records the phrases in the description/keyword text that were linked to the respective unambiguous concept. In this case the mentions are "dogs" which links to Q144, and "hats" which links to Q80151.

A knowledge base in step 316 may include any publicly available knowledge base (closed or open to a crowdsource collaboration). Step 316 allows online marketplace 332 to translate between English terminology provided in the asset metadata to a language agnostic entity representation. In such language-agnostic representation, the two entities from the above example (e.g., "dog" and "hat") may be provided in more than 50 languages. In the present disclosure, the selected knowledge base is represented in the world's most commonly spoken languages by accepting input from multiple users across the world. The output of step 316 is stored in a knowledge graph 342 that links the digital assets to their associated unambiguous concepts.

In step 318, consumer 301 purchases/licenses a digital asset from online marketplace engine 332. When a digital asset is purchased/licensed in step 318, the user behavior is recorded in a behavioral database 352. For example, database 352 may store that consumer 301 entered a search query such as “dogs” and that it resulted in a purchase/licensing event for a particular asset at a particular time. In some embodiments, step 318 includes combining data from behavioral database 352 and the output from step 316 to produce a ranked list of the top search queries that result in purchase/licensing events within a specific input time frame (TF). For each such top search query (TSQ), step 318 includes linking a TSQ to one or more unambiguous concepts by finding the most relevant mention-to-concept links for online marketplace 332. A relevance score can be defined in the context of all mention-to-entity links associated with a fixed mention. This generates a one-to-many mapping between mentions and unambiguous concepts.

In one embodiment, a relevance score for each mention-to-concept link would be to consider all mention-to-concept links in the entire digital asset catalog in online marketplace engine 232. Accordingly, step 320 may include, for a fixed mention m, generating a ranked list $(e_1, c_1)$, $(e_2, c_2)$, . . . , where $c_i$ is the number of mention-to-concept links between mention m and unambiguous concept $e_1$, sorted in descending order of $c_i$ values. The first entity in this sorted list may be the most relevant mapping between mention m and a given unambiguous concept (at least when considering all assets in the catalog).

In some embodiments, step 320 includes mention-to-concept links on the media files that were licensed for a specific search query. This provides more relevant mappings based on user behavior. Step 320 may include mapping the TSQ to the most relevant mention-to-concept link, or even to the top few such relevant links, when the counts are similar. For example, when the query is “web,” many relevant links may be counted for both “web banner” (Q385354) as well as “spider web” (Q188691). In circumstances where the most relevant link is not in the overwhelming majority, step 320 may include adding more than a single TSQ for creating and updating sitemaps/category structures.

In some embodiments, step 320 includes storing the TSQ along with its set of most relevant mention-to-concept mappings, and an associated licensing weight in a database, along with the input time frame TF. In some embodiments, a licensing weight may include the count associated with the unambiguous concept, above (e.g., the $c_j$ values). In some embodiments, step 320 includes approximating the licensing weight by converting counts $c_j$ into a probability distribution (e.g., each count mapped to the range [0,1] such that the sum of all mapped counts is 1), and multiplying this probability by the licensing weight of the TSQ. In some embodiments, step 320 further includes generating a multilingual sitemap and a multilingual category structure, as disclosed herein.

Figure 4:
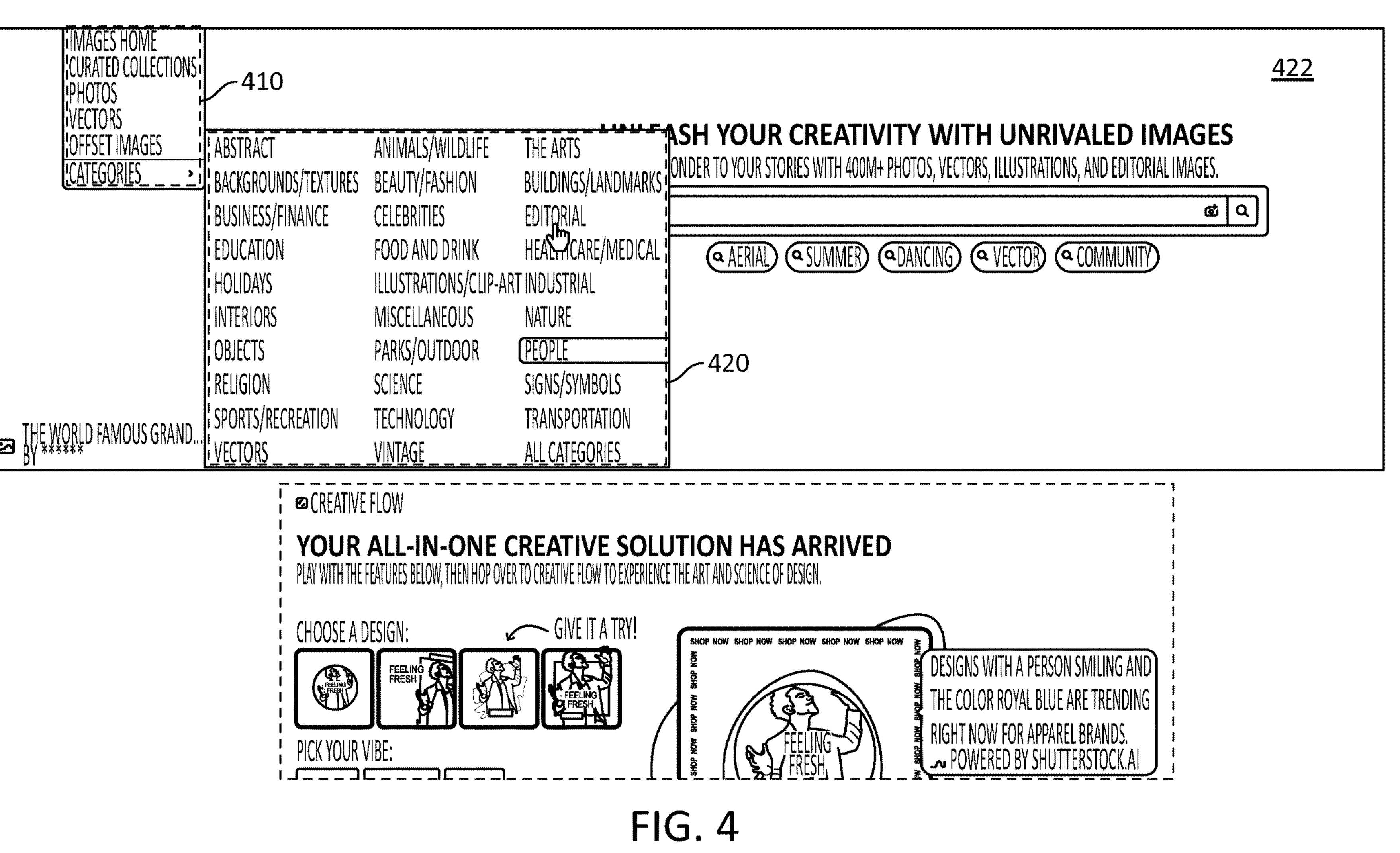
FIG. 4 is a screenshot of an application for a document producer to upload a media file onto an online marketplace, according to some embodiments.

FIG. 4 is a screenshot 400 of an application 422 for a document producer to upload a media file onto an online marketplace, according to some embodiments. A menu 410 lists a number of options for the document producer, including the category listing 420 into which the media file should be placed. The document producer may also provide a brief description or caption of the media file, including selected keywords, in the document producer’s own language. Application 422 may include other recommendations 450 for the document producer in terms of graphic designs and formats to use for preparing media files to upload to the online marketplace.

Figure 5A:
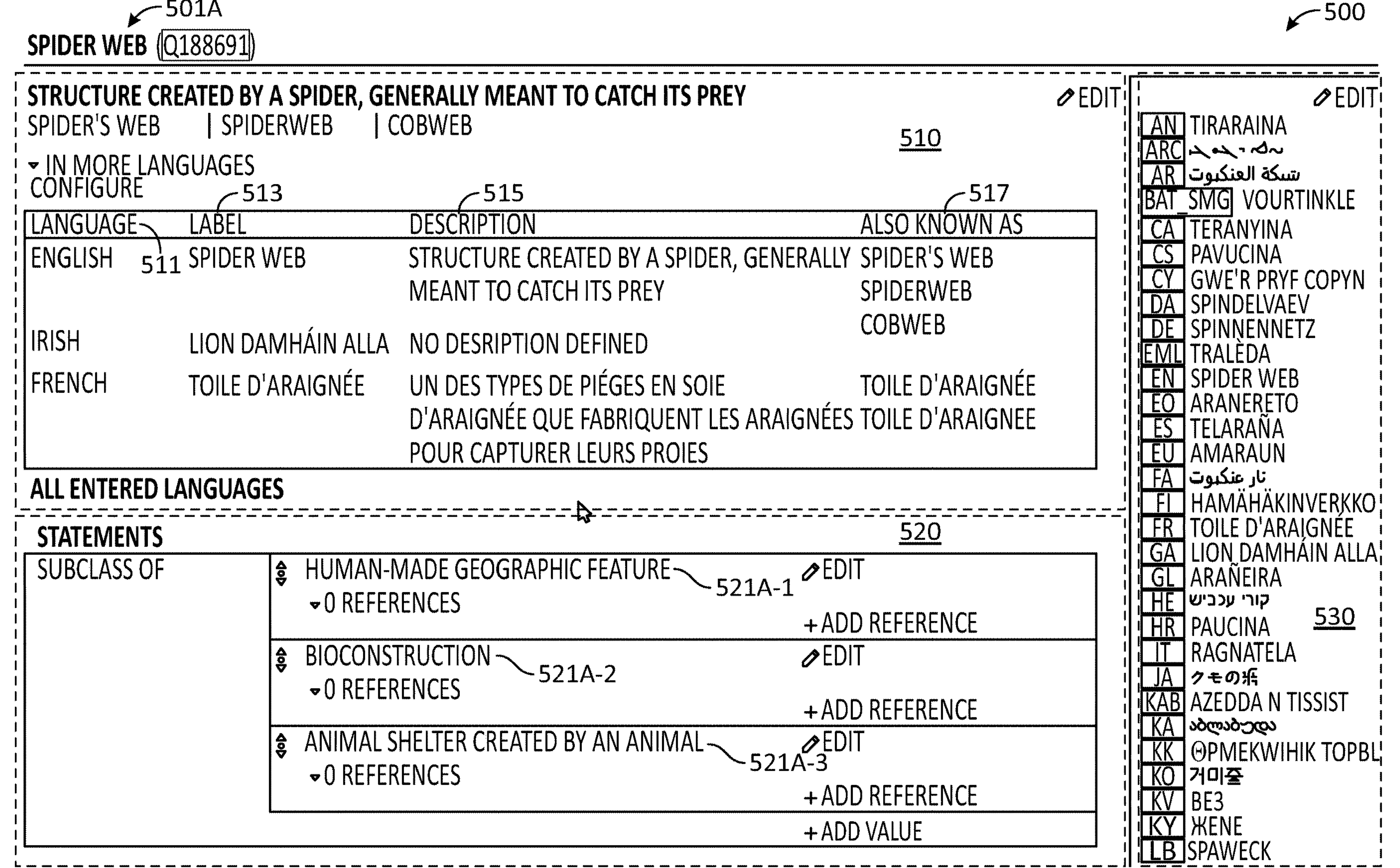
FIGS. 5A-5B illustrate screenshots of knowledge bases with multiple unambiguous concepts arranged in different hierarchy levels, according to some embodiments.
Figure 5B:
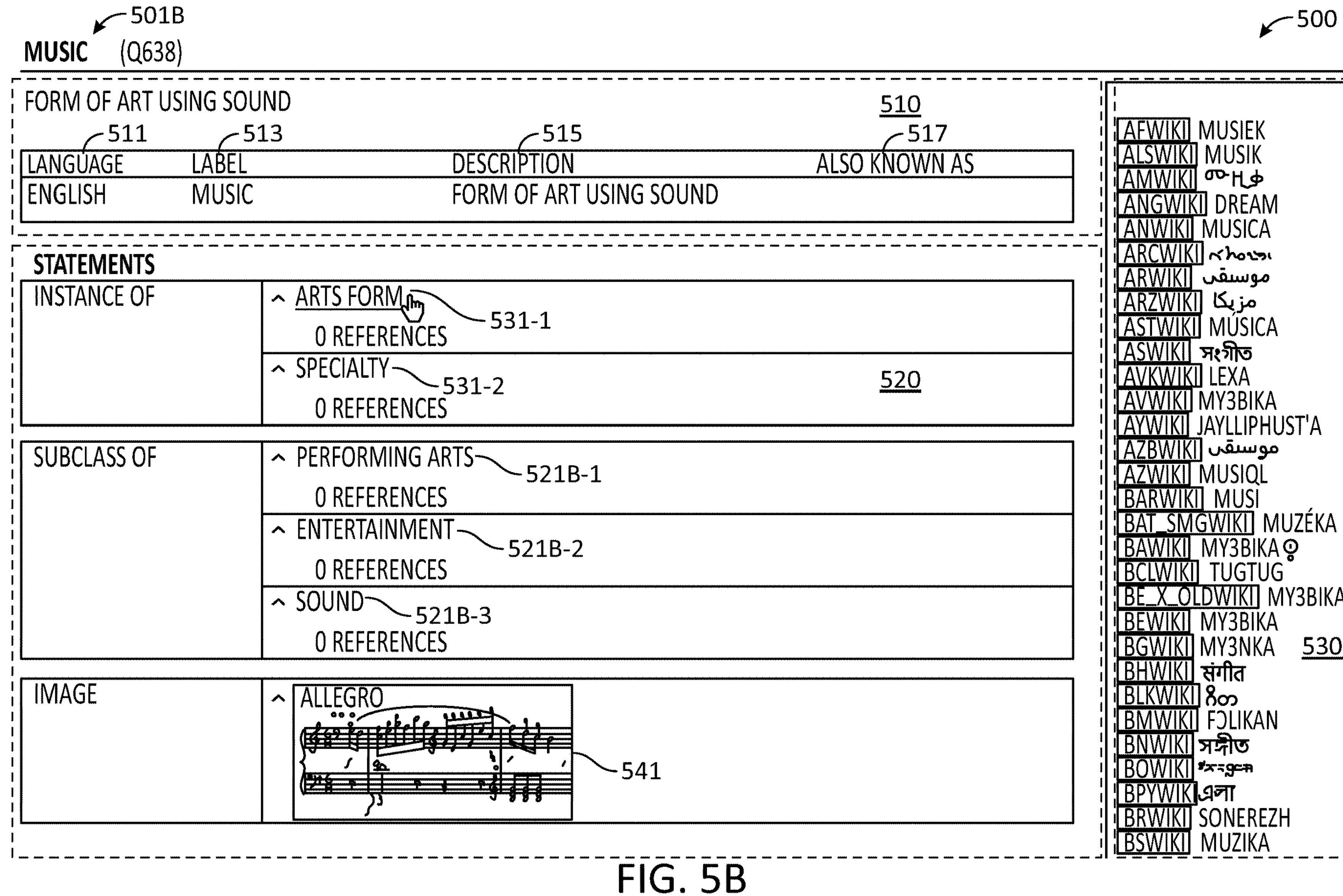

FIGS. 5A-5B illustrate screenshots of a knowledge base 500 with two unambiguous concepts 501A (“spider Web”) and 501B (“Music,” hereinafter, collectively referred to as “unambiguous concepts 501”) including language translations 510 and 530, and further annotations 520, according to some embodiments. In some embodiments, annotations 520 are provided, updated, and corrected by the general public in a crowdsourcing scheme. This provides a translation source with continuous self-correcting and improvement.

Language translations 510 may provide details of labels 513 corresponding to the unambiguous concept 501 in a given language 511, with a description 515 in the target language, and even some synonym examples 517.

Annotations 520 may include parent categories 521A-1 (“human-made geographic feature”), 521A-2 (“bioconstruction”), 521A-3 (“animal shelter created by an animal”) and 521B-1 (“performing arts”), 521B-2 (“entertainment”), and 521B-3 (“sound,” hereinafter, collectively referred to as “parent categories 521”). In some embodiments, annotations 520 may also include instance notes 531-1 (“arts form”) and 531-2 (“specialty,” hereinafter, collectively referred to as “instance notes 531”). In some embodiments, annotations 520 may further include a resource, asset, media file, or image 541 associated with the unambiguous concept 501.

Figure 6:
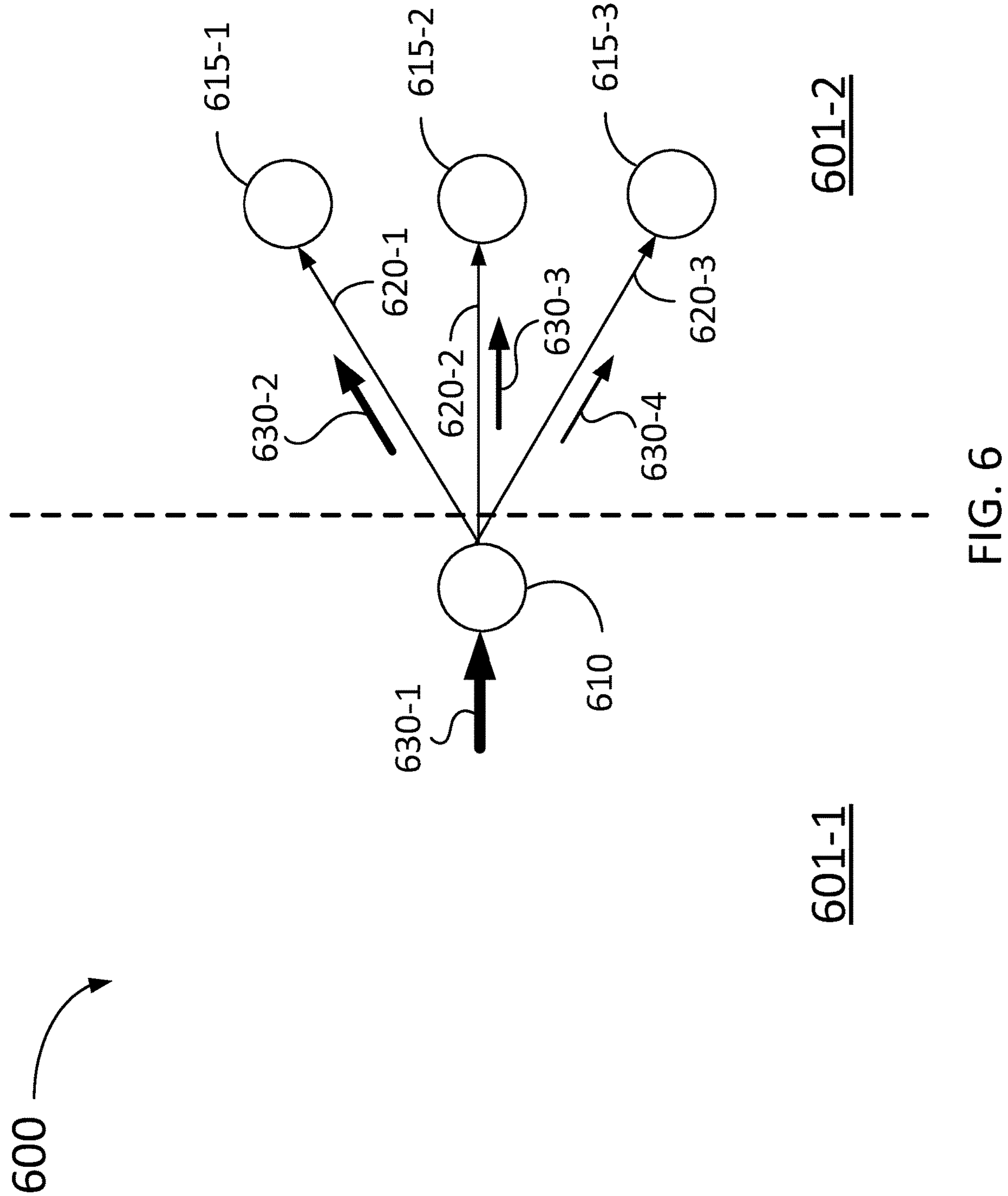
FIG. 6 is a partial view of a data structure including a parent node and child nodes joined by links indicative of an information flow for a search engine to implement a language agnostic search in an online marketplace, according to some embodiments.

FIG. 6 is a partial view of a data structure 600 including a parent node 610 and child nodes 615-1, 615-2, and 615-3 (hereinafter, collectively referred to as “child nodes 615”) joined by links 620-1, 620-2, and 620-3 (hereinafter, collectively referred to as “links 620”) indicative of an information flow 630-1, 630-2, 630-3, and 630-4 (hereinafter, collectively referred to as “information flows 630”) for a search engine to implement a language agnostic search in an online marketplace, according to some embodiments. Information flows 630 may include propagation coefficients indicative of a network search traffic passing through nodes 610 and 615. Accordingly, parent node 610 has a higher propagation coefficient than that of a child node.

Each node 610 and 615 has a first label associated to a network resource. The first label is associated with one or more words in a first language, indicative of an inambiguous concept in a knowledge base. In some embodiments, at least one of nodes 610 may include a second label in a second language, associated with the same network resource. In some embodiments, parent node 610 may include a label in a first language and at least one of child nodes 615 includes a label in a second language different from the first language. Child nodes 615 belong in the same hierarchy level and each may be labeled in different languages. In some embodiments, a query in the first language causes the search engine to navigate from a first node to arrive at a media file in a second node including a label in a second language that is different from the first language.

In that regard, the unambiguous concept associated with parent node 610 may belong in a higher category level 601-1 than a category level 601-2 (hereinafter, collectively referred to as “category levels 601”) for an unambiguous concept associated with child nodes 615. The network resource includes one or more media files associated with a license weight. Accordingly, data structure 600 is constructed such that the license weight is higher for parent node 610 than for child nodes 615. Links 620 indicate a navigation route for a search engine to move from parent node 610 to any one of child nodes 615 in search of a pre-selected media file.

Data structure 600 may include a multilingual sitemap. To build data structure 600, the system selects one or more TSQs stored in the database, and sorts the labels for each unambiguous concept in a target language. A ranking score for sorting the labels may include the licensing weight. A search engine may “crawl back” data structure 600 to obtain search results for a query input in the first language. Likewise, the results for search queries that arrive to the same category level 601 should be linked to the same or similar media files, regardless of the language. For example, a node 615-1 associated with "http://shutterstock.com/en/search/dog" should get the same results as a node 615-2 associated with "http://shutterstock.com/de/search/hund" since the "de" or German localization of the website when searching for the German word "hund" should provide an equivalent user experience as the English language site when searching for "dog."

Data structure 600 may also include a multilingual categorization: Given the list used for the multilingual sitemaps, we can define data driven category structures that better reflect user behavior on the online digital marketplace automatically. In some embodiments, data structure 600 includes a directed acyclic graph (DAG), where unambiguous concepts in child nodes 615 have a link 620 to one or more parent nodes 610. Accordingly, data structure 600 may include many category levels 601. In some embodiments, category levels 601 are associated with the licensing weight of the associated media files in the nodes included therein. Given a weighted DAG, in some embodiments, data structure 600 includes the most relevant DAG nodes selected according to information flows 630, graph centrality measures, supervised techniques, and any combination thereof. The labels within each category level 601 may include multiple languages. Thus, a translation into a desired target language may be performed by direct lookup of the labels within each category label 601.

Figure 7:
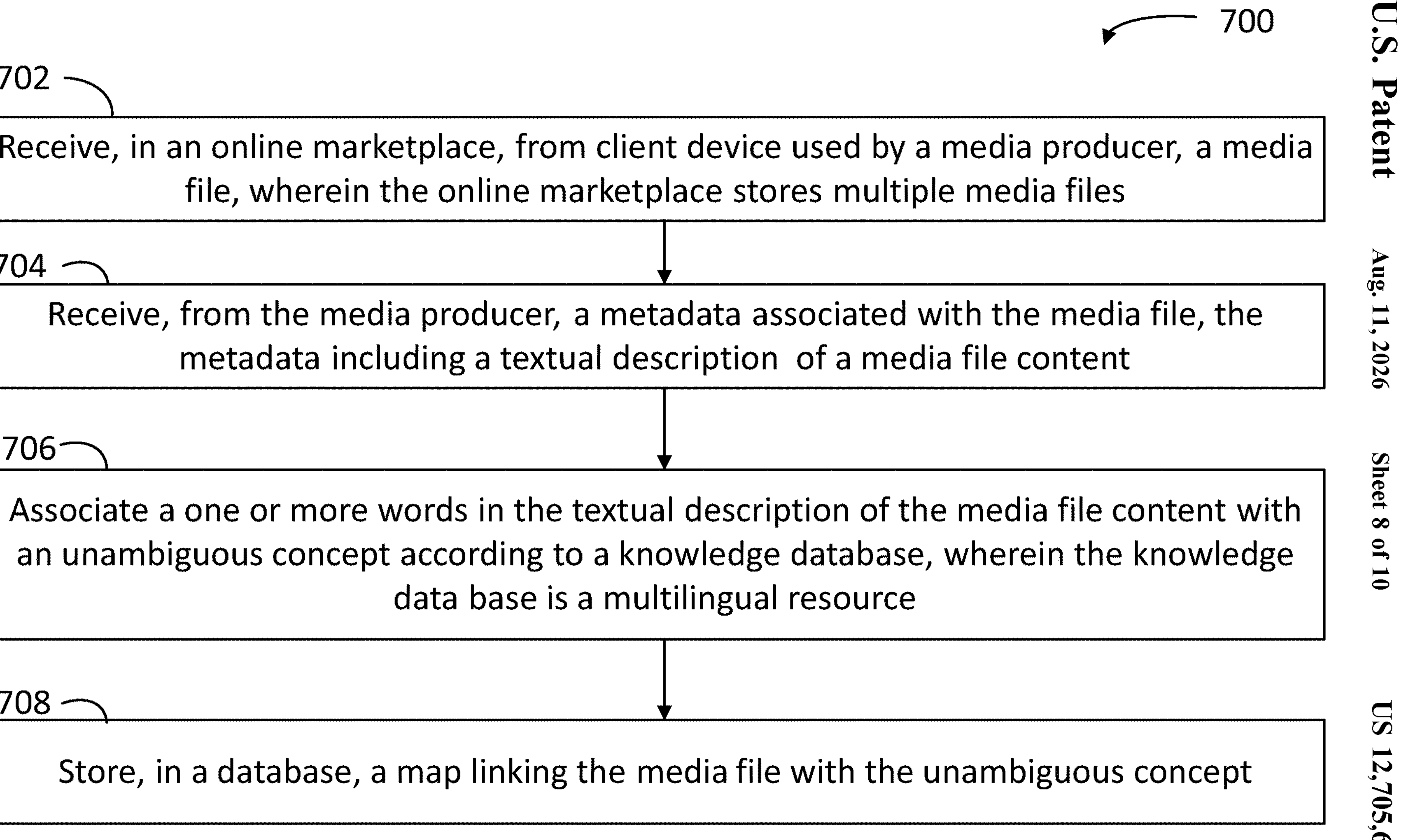
FIG. 7 is a flowchart illustrating steps in a method for uploading a media file in the data structure of FIG. 6, according to some embodiments.

FIG. 7 is a flowchart illustrating steps in a method for uploading a media file in a data structure (cf. data structure 600), according to some embodiments. At least one or more of the steps in method 700 may be performed by a computer system in a client device or a server, the client device and the server being communicatively coupled through a network via a communications module (e.g., client device 110, server 130, network 150, and communications modules 218). The computer system may include a memory storing instructions which, executed by a processor, perform at least partially one or more of the steps in method 700 (e.g., processors 212 and memories 220). In some embodiments, one or more steps in method 700 is at least partially executed by an application installed in the client device and hosted by a marketplace engine and a search engine in the server (e.g., application 222, marketplace engine 232, and search engine 234). Further, in some embodiments, one or more of the steps in method 700 may be performed by a knowledge base tool, a mapping tool, a classification tool, a scoring tool, and a ranking tool (e.g., knowledge base tool 240, mapping tool 242, classification tool 244, scoring tool 246, and ranking tool 248). Further, in some embodiments, data and information used in, or generated by, at least one of the steps in method 700 may be stored in a database communicatively coupled to, and hosted by, the server (e.g., database 252). Methods consistent with the present disclosure may include at least one or more of the steps in method 700 performed in a different order. For example, in some embodiments, steps in method 700 may be performed simultaneously, quasi-simultaneously, or overlapping in time.

Step 702 includes receiving, in an online marketplace, from a client device used by a media producer, a media file, wherein the online marketplace stores multiple media files.

Step 704 includes receiving, from the media producer, a metadata associated with the media file, the metadata including a textual description of a media file content. In some embodiments, step 704 includes receiving, from the media producer, one or more keywords associated with the media file.

Step 706 includes associating a one or more words in the textual description of the media file content with an unambiguous concept according to a knowledge database, wherein the knowledge database is a multilingual resource. In some embodiments, step 706 includes recording a phrase or keyword from the textual description linked to the unambiguous concept in the knowledge database. In some embodiments, step 706 includes recording a number of keywords or phrases in the textual description of the media file that are associated with the unambiguous concept.

Step 708 includes storing, in a database, a map linking the media file with one or more unambiguous concepts. In some embodiments, step 708 includes storing a user behavior when a license for the media file is requested in the online marketplace. In some embodiments, step 708 includes updating a ranked list of search queries involved in a licensing event within a pre-selected time period, based on a number of annotations in the map linking the unambiguous concept and each media file involved in the licensing event. In some embodiments, step 708 includes updating a ranked list of search queries in the online marketplace within a pre-selected time period, based on a number of annotations in the map linking the unambiguous concept and each media file in the online marketplace. In some embodiments, step 708 includes determining a licensing weight to each search query in a ranked list, the licensing weight indicative of a likelihood that a licensing event results from the search query. In some embodiments, step 708 includes selecting a target language and finding, in the map, a one or more words and keywords in the target language linked to each media file associated with a search query, ranking the one or more words and keywords in the target language based on a licensing weight for the media file, and forming a language-based map to receive search queries in the target language. In some embodiments, step 708 includes forming a data structure in a target language from the map by identifying a parent label and a child label for each media file, wherein the parent label has a larger number of annotations in the target language relative to the child label.

Figure 8:
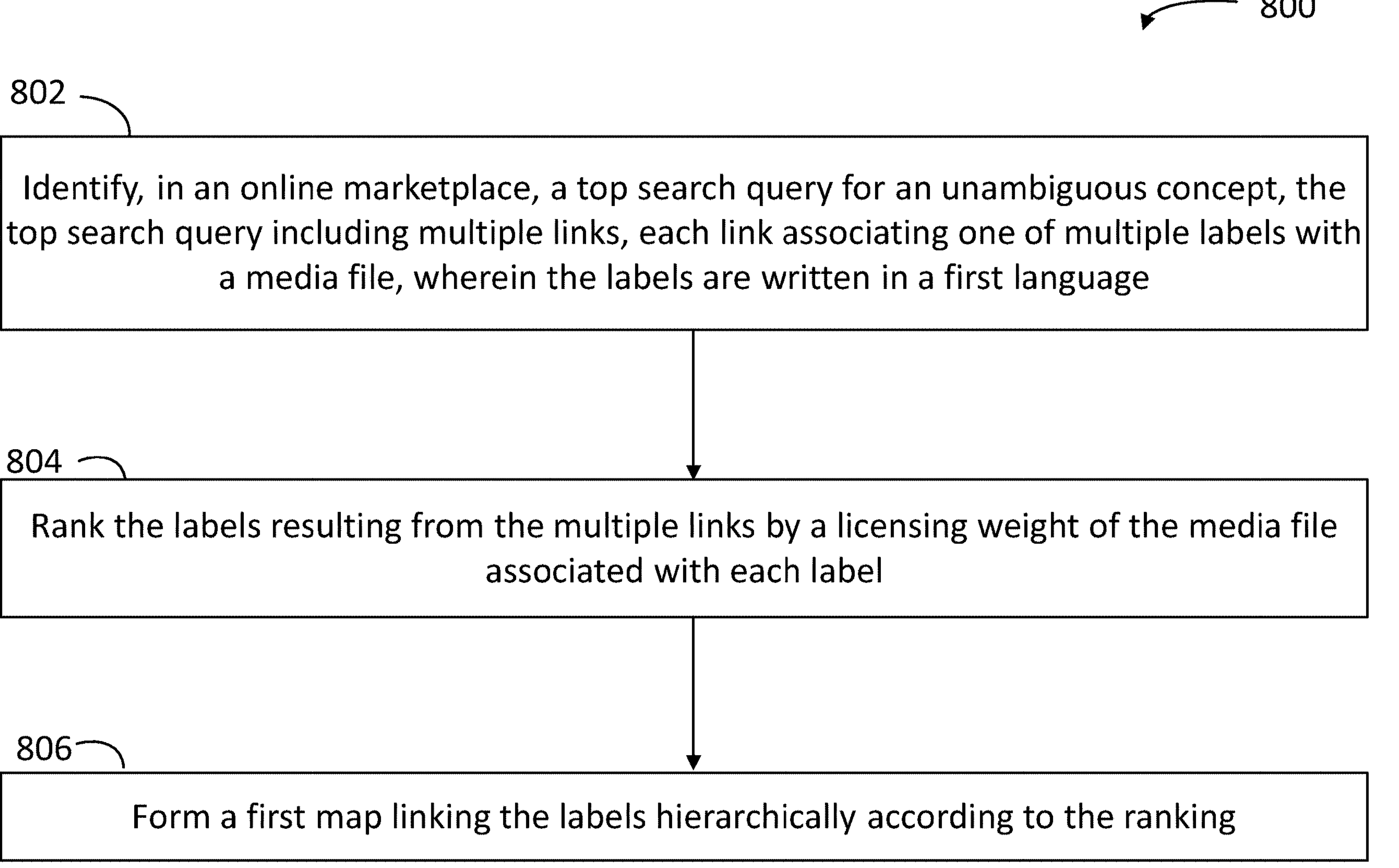
FIG. 8 is a flowchart illustrating steps in a method for creating a multilingual sitemap in an online marketplace configured for language-agnostic searches, according to some embodiments.

FIG. 8 is a flowchart illustrating steps in a method 800 for creating a multilingual sitemap in an online marketplace configured for language-agnostic searches, according to some embodiments. At least one or more of the steps in method 800 may be performed by a computer system in a client device or a server, the client device and the server being communicatively coupled through a network via a communications module (e.g., client device 110, server 130, network 150, and communications modules 218). The computer system may include a memory storing instructions which, executed by a processor, perform at least partially one or more of the steps in method 800 (e.g., processors 212 and memories 220). In some embodiments, one or more steps in method 800 is at least partially executed by an application installed in the client device and hosted by a marketplace engine and a search engine in the server (e.g., application 222, marketplace engine 232, and search engine 234). Further, in some embodiments, one or more of the steps in method 800 may be performed by a knowledge base tool, a mapping tool, a classification tool, a scoring tool, and a ranking tool (e.g., knowledge base tool 240, mapping tool 242, classification tool 244, scoring tool 246, and ranking tool 248). Further, in some embodiments, data and information used in, or generated by, at least one of the steps in method 800 may be stored in a database communicatively coupled to, and hosted by, the server (e.g., database 252). Methods consistent with the present disclosure may include at least one or more of the steps in method 800 performed in a different order. For example, in some embodiments, steps in method 800 may be performed simultaneously, quasi-simultaneously, or overlapping in time.

Step 802 includes identifying, in an online marketplace, a top search query (TSQ) for an unambiguous concept, the top search query including multiple links, each link associating one of multiple labels with a media file, wherein the labels are written in a first language. The TSQ may be identified based on a relevance score of mention-to-entity links, where "entities" are unambiguous concepts in a knowledge base (cf. step 320 in FIG. 3), using ($e_i$, $c_i$) pairs of concepts $e_i$ and associated links, $c_i$, for one or more (or all) media files in the database.

Step 804 includes ranking the labels resulting from the multiple links by a licensing weight of the one or more media files associated with each label.

Step 806 includes forming a first map linking the labels hierarchically according to the ranking. In some embodiments, step 806 includes linking one label in a higher level to multiple labels in a lower label when more than one label share a same licensing weight. In some embodiments, step 806 includes forming a second map when the labels are written in a second selected language, and cross-correlating a label in the first map with a label in the second map that belong in a same hierarchy level. In some embodiments, step 806 includes determining an information propagation pattern in the first map, ranking each node in the first map by an information flow through the node, and selecting the labels in a top ranked node as an unambiguous concept in a knowledge base. In some embodiments, step 806 includes forming a dictionary of unambiguous concepts by cross-correlating top ranked nodes in a second map for a second language with top ranked nodes in the first map.

Hardware Overview

Figure 9:
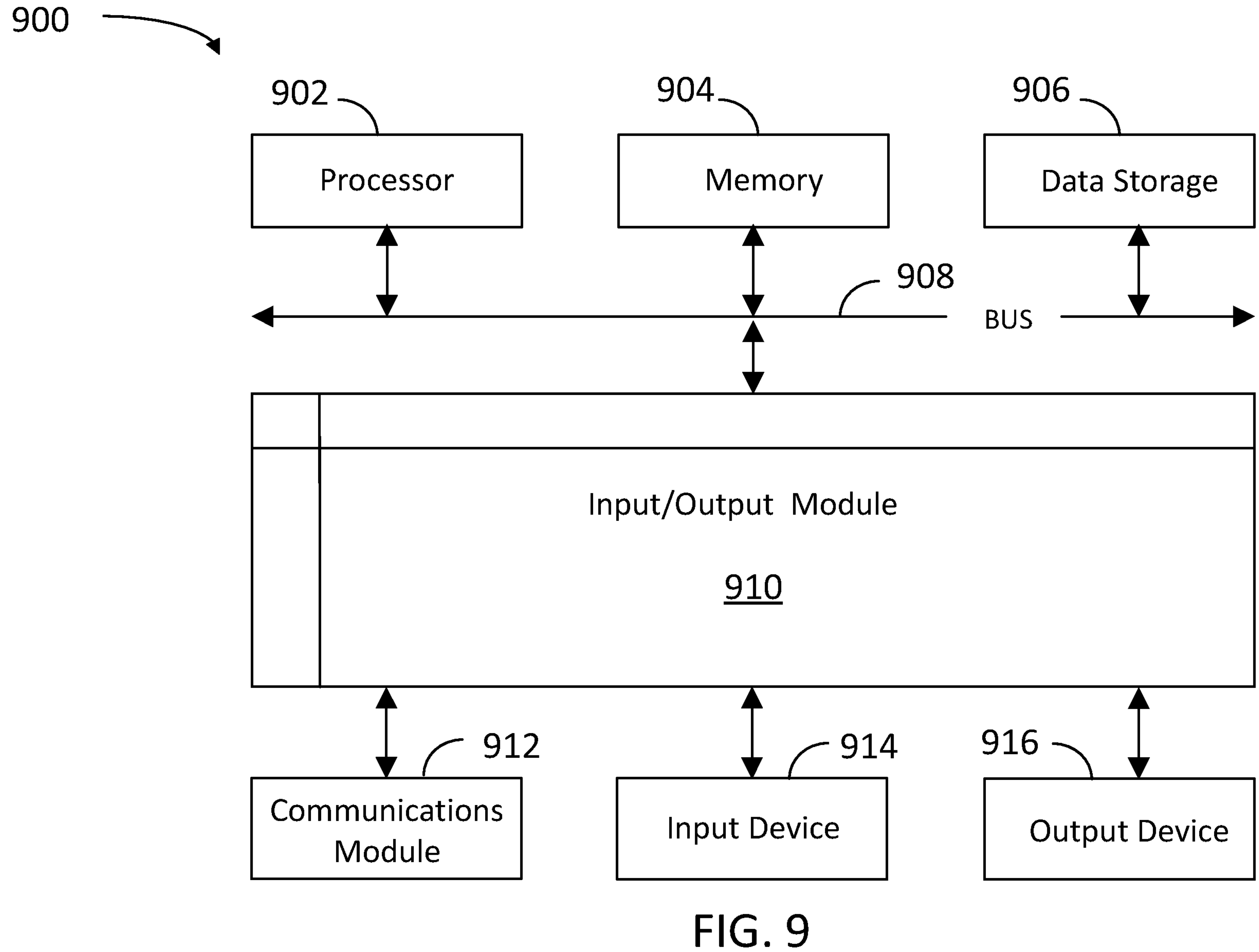
FIG. 9 is a block diagram illustrating an example computer system with which the client and server of FIGS. 1 and 2 and the methods of FIGS. 7-8 can be implemented.

FIG. 9 is a block diagram illustrating an exemplary computer system 900 with which the client and server of FIGS. 1 and 2, and the methods of FIGS. 7 and 8 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processors 212) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as an LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:

receiving, in an online marketplace, from a client device used by a media producer, a media file, wherein the online marketplace stores multiple media files;

receiving, from the media producer, a metadata associated with the media file, the metadata including a textual description of a media file content;

associating a one or more words in the textual description of the media file content with an unambiguous concept according to a knowledge database, wherein the knowledge database is a multilingual resource;

storing, in a database, a map linking the media file with the unambiguous concept;

forming a data structure in a target language from the map by identifying a parent label and a child label for each media file, wherein the parent label has a larger number of annotations in the target language relative to the child label, and wherein a link joining a parent node associated with the parent label to a child node associated with the child label indicates a navigation route for a search engine to move from the parent node to the child node in search of the media file; and executing, by the search engine, a traversal of the data structure to retrieve the media file in response to a query made in the target language, wherein the traversal is constrained to parent-to-child links for which the parent node has a greater number of target-language annotations than the child node.

2. The computer-implemented method of claim 1, wherein receiving the metadata further comprises receiving, from the media producer, one or more keywords associated with the media file.

3. The computer-implemented method of claim 1, wherein associating the one or more words in the textual description of the media file comprises recording a phrase or keyword from the textual description linked to the unambiguous concept in the knowledge database.

4. The computer-implemented method of claim 1, wherein associating the one or more words in the textual description of the media file comprises recording a number of keywords or phrases in the textual description of the media file that are associated with the unambiguous concept.

5. The computer-implemented method of claim 1, further comprising storing a user behavior when a license for the media file is requested in the online marketplace.

6. The computer-implemented method of claim 1, further comprising updating a ranked list of search queries involved in a licensing event within a pre-selected time period, based on a number of the annotations in the map linking the unambiguous concept and each media file involved in the licensing event.

7. The computer-implemented method of claim 1, further comprising updating a ranked list of search queries in the online marketplace within a pre-selected time period, based on a number of the annotations in the map linking the unambiguous concept and each media file in the online marketplace.

8. The computer-implemented method of claim 1, further comprising determining a licensing weight to each search query in a ranked list, the licensing weight indicative of a likelihood that a licensing event results from the search query.

9. The computer-implemented method of claim 1, further comprising selecting the target language and finding, in the map, a one or more words and keywords in the target language linked to each media file associated with a search query, ranking the one or more words and keywords in the target language based on a licensing weight for the media file, and forming a language-based map to receive search queries in the target language.

* * * * *